United States Patent
Saliba et al.

[11] Patent Number: 5,971,310
[45] Date of Patent: Oct. 26, 1999

[54] POSITIVE ENGAGEMENT BUCKLE FOR A TAPE DRIVE AND CARTRIDGE

[75] Inventors: George Saliba, Northboro; Satya Mallick, Milford; An Quach, Worcester, all of Mass.; Larry Albrecht, Louisville; Sheldon Helms, Longmont, both of Colo.; Chan Kim, Holliston; Neil Stanick, Whitinsville, both of Mass.; Christopher Rathweg, LaFayette, Colo.

[73] Assignee: Quantum Corporation, Milpitas, Calif.

[21] Appl. No.: 09/149,759

[22] Filed: Sep. 8, 1998

[51] Int. Cl.⁶ .................................................... G03B 1/58
[52] U.S. Cl. .................................. 242/332.4; 242/532.1; 242/532.7; 242/582
[58] Field of Search ............................ 242/332.4, 332.7, 242/332.8, 532.1, 532.6, 532.7, 582; 226/92

[56] References Cited

U.S. PATENT DOCUMENTS

| | | | |
|---|---|---|---|
| 4,110,774 | 8/1978 | Krehbiel et al. | 354/345 |
| 4,330,096 | 5/1982 | Bartel et al. | 242/74.1 |
| 4,572,460 | 2/1986 | Hertrich | 242/332.4 |
| 4,577,811 | 3/1986 | Bray et al. | 242/332.1 |
| 4,608,614 | 8/1986 | Rinkleib et al. | 360/95 |
| 4,646,177 | 2/1987 | Sanford et al. | 360/95 |
| 4,662,049 | 5/1987 | Hertrich . | |
| 4,720,913 | 1/1988 | Hertrich | 29/819 |
| 4,832,284 | 5/1989 | Inoue | 242/332.4 |
| 5,046,168 | 9/1991 | Ohsaki | 242/332.4 |
| 5,219,129 | 6/1993 | Spicer et al. | 242/195 |
| 5,303,875 | 4/1994 | Hoge et al. | 242/197 |
| 5,374,003 | 12/1994 | Hoge et al. | 242/332.7 |
| 5,443,220 | 8/1995 | Hoge et al. | 242/332.8 |
| 5,542,620 | 8/1996 | Ohshita | 242/332.4 |
| 5,769,346 | 6/1998 | Daly | 242/332.4 |

FOREIGN PATENT DOCUMENTS

| | | | |
|---|---|---|---|
| 1547015 | 10/1969 | Germany | 242/332.4 |
| 716632 | 10/1954 | United Kingdom | 242/332.4 |
| 1167445 | 10/1969 | United Kingdom | 242/332.4 |

*Primary Examiner*—Donald P. Walsh
*Assistant Examiner*—Minh-Chau Pham
*Attorney, Agent, or Firm*—Nydegger & Associates

[57] ABSTRACT

A tape drive and cartridge are provided herein. The tape drive and cartridge include an improved buckle which securely couples a take-up leader of the tape drive to a cartridge leader of the cartridge. As provided herein, the buckle includes a first buckle component and a second buckle component which securely retain the take-up leader to the cartridge leader. More specifically, the first buckle component includes a buckle bar and the second buckle component includes a pair of spaced apart receivers which engage the buckle bar to securely retain the take-up leader to the cartridge leader. Importantly, the unique buckle provided herein inhibits leader runaway and has improved durability.

34 Claims, 8 Drawing Sheets

POSITIVE ENGAGEMENT BUCKLE FOR A TAPE DRIVE AND CARTRIDGE

FIELD OF THE INVENTION

The present invention relates generally to tape drives and cartridges which use a storage tape to store and transfer data. More specifically, the present invention relates to a tape drive and cartridge having an improved buckle for securely coupling a cartridge leader on the storage tape to a take-up leader of the tape drive.

BACKGROUND

Tape drives are widely used for storing information in digital form. These tape drives commonly use a storage tape having a thin film of magnetic material which receives the information. Typically, the storage tape is moved between a pair of spaced apart reels, past a data transducer to record or read back information from the storage tape.

In one type of tape drive system, one of the reels is part of the tape drive while the other reel is part of a removable cartridge. For this type of tape drive system, the reel which is a part of the tape drive is commonly referred to as a take-up reel, while the reel which is a part of the cartridge is commonly referred to as a cartridge reel. With this system, upon insertion of the cartridge into the tape drive, it is necessary to couple the storage tape on the cartridge reel to the take-up reel of the tape drive. Subsequently, the storage tape must be uncoupled from the take-up reel, prior to removing the cartridge from the tape drive system.

Typically, a cartridge leader on the storage tape is automatically coupled to a take-up leader which is connected to the take-up reel during insertion of the cartridge into the tape drive. The procedure of connecting the take-up leader with the cartridge leader is commonly referred to as "buckling" or "coupling". Subsequently, during ejection of the cartridge, the cartridge leader is unbuckled from the take-up leader.

FIG. 1A illustrates a prior art cartridge leader 100 uncoupled from a prior art take-up leader 102. FIG. 1B illustrates the prior art cartridge leader 100 coupled to the prior art take-up leader 102. In this prior art embodiment, the cartridge leader 100 includes a hoop 104 and a notch 106, while the take-up leader 102 includes a mushroom shaped tab 108 having a nose 110 and a neck 112. The hoop 104 is dimensioned to enable the nose 110 and neck 112 of the take-up leader 102 to pass therethrough. The notch 106 is dimensioned to receive the neck 112, but prevent the nose 110 from passing therethrough. Commonly assigned U.S. Pat. Nos. 4,662,049 and 4,720,913 provide a detailed discussion of this type of tape buckling arrangements. The contents of U.S. Pat. Nos. 4,662,049 and 4,720,913 are incorporated herein by reference.

Unfortunately, this type of tape buckling arrangement is not completely satisfactory. Under certain circumstances, the take-up leader 102 can become unbuckled from the cartridge leader 100 before the cartridge leader 100 has been pulled onto the take-up reel. This is commonly referred to as "leader runaway". During leader runaway, the take-up leader 102 can retract onto the take-up reel and the cartridge leader 100 can retract into the cartridge.

One cause of leader runaway is a loss of tension in leaders 100, 102 before the cartridge leader 100 is pulled onto the take-up reel. During a loss of tension, the nose 110 can slip up into the hoop 104 and become disengaged from the notch 106. Another cause of leader runaway is excessive use of the tape drive. More specifically, the prior art leaders 100, 102 are each made of plastic. After excessive use, edges 114 of the nose 110 of the tab 108 begin to weaken. During usage, the weakened plastic edges 114 of the tab 108 can deflect and allow the tab 108 to pass through the notch 106.

When leader runaway occurs, the tape drive must be returned to the manufacturer for repairs and the customer does not have access to the information on the storage tape while the tape drive is being repaired. Accordingly, there is a need for an easy and accurate way to reliably couple and de-couple the storage tape to the take-up reel of tape drive.

In light of the above, it is an object of the present invention to provide a buckle for a tape drive and cartridge which securely retains the cartridge leader to the take-up leader. Another object of the present invention is to provide a buckle which resists unbuckling during a loss of tension in the leaders. Yet another object of the present invention is to provide a tape drive which is compatible with other prior art cartridges. Still another object of the present invention is to provide a buckle having improved durability, which is relatively easy and cost efficient to manufacture and utilize.

SUMMARY

The present invention is directed to a combination of a tape drive and cartridge which satisfies these objectives. The tape drive and cartridge include an improved buckle which couples a take-up leader of the tape drive to a cartridge leader of the cartridge. As provided in detail below, the buckle utilizes durable components to solidly couple the cartridge leader to the take-up leader. This reduces the possibility of leader runaway and improves the durability of the buckle. Additionally, the buckle is positioned outside of the path of the storage tape on the cartridge. This minimizes the chances of the buckle damaging the storage tape.

The buckle includes a first buckle component secured to one of the leaders and a second buckle component secured to the other one of the leaders. Depending upon the embodiment, the first buckle component can be attached to the take-up leader while the second buckle component is attached to the cartridge leader. Alternately, the second buckle component can be attached to the take-up leader while the first buckle component is attached to the cartridge leader.

In one embodiment, the first buckle component includes a bar shaped, buckle bar which is secured to one of the leaders. The buckle bar is elongated and includes a pair of opposed bar ends. The buckle bar extends transversely across the leader and has a first bar section and a spaced apart second bar section which cantilever away from the edges of the leader.

The second buckle component can include a first receiver and a spaced apart second receiver. Each receiver is sized and shaped to receive a portion of one of the bar sections to couple the take-up leader to the cartridge leader. In one embodiment, the receivers can be attached together with a connector bar, which is secured to the cartridge leader. Preferably, the connector bar is longer than a tape width of the storage tape. This allows the connector bar to engage a cartridge stop in the cartridge. Thus, the connector bar additionally inhibits the cartridge leader from being pulled back into the cartridge.

In one embodiment of the receiver, each receiver includes a channel which is sized and shaped to receive one of the bar ends of the buckle bar. In this embodiment, the buckle bar is initially inserted into a channel opening in the channel. Next, the buckle bar is forced to slide in the channel until the buckle bar contacts a channel end of the channel. Preferably, the channel includes a bump which protrudes into the channel prior to the channel end. The bump inhibits the buckle bar from sliding along the channel if a loss of tension occurs in the leaders.

Preferably, the take-up leader is also compatible with one or more prior art cartridges. For example, the take-up leader can also include a leader tab which projects away from a distal end of the take-up leader. The leader tab is adapted to engage a leader hoop and a notch area of a prior art cartridge leader. This feature allows the tape drive to be compatible with prior art cartridges.

Importantly, the buckle provided herein enhances buckling reliability between the cartridge leader and the take-up leader. This reduces the possibility of leader runaway. Additionally, the durability of the buckle is significantly enhanced.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 2:
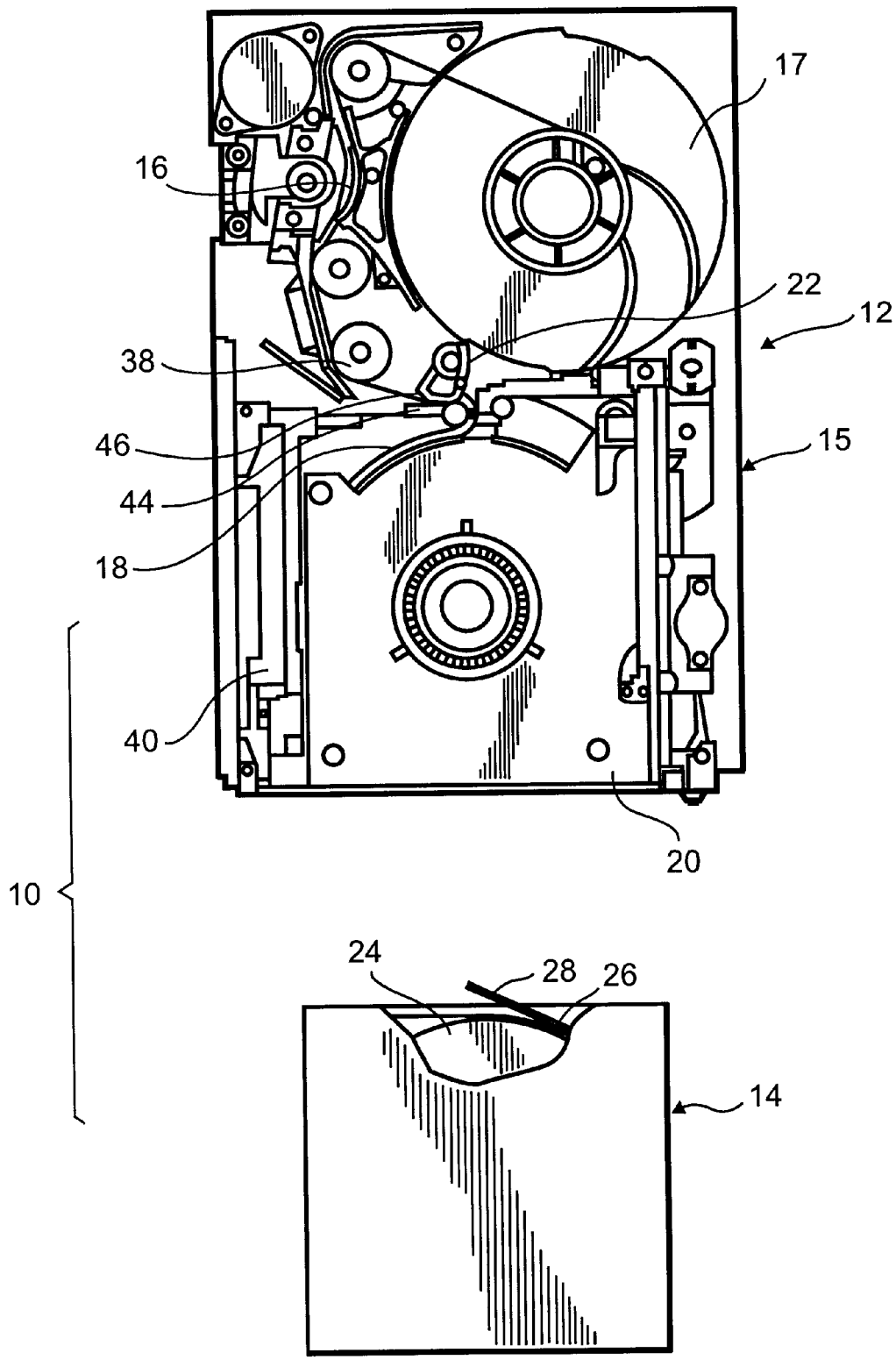
FIG. 2 is a top plan view of a portion of a tape drive and a cartridge in partial cut-away having features of the present invention.

A combination 10 including a tape drive 12 and a cartridge 14 having features of the present invention is illustrated in FIG. 2. The tape drive 12 includes a drive housing 15, a data transducer 16, a take-up reel 17 including a take-up leader 18, a receiver 20, and a buckling device 22. The cartridge 14 includes a cartridge reel 24 which contains a storage tape 26 having a cartridge leader 28. A buckle 30 (illustrated in FIGS. 5A–8B) is utilized to secure the take-up leader 18 to the cartridge leader 28. As provided in detail below, the buckle 30 is uniquely designed to reliably and securely couple the cartridge leader 28 to the take-up leader 18. This reduces the likelihood of leader runaway. Further, as provided herein, the buckle 30 is made of durable materials to increase the operational life of the buckle 30.

A detailed description of the various components of a tape drive 12 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of the tape drive 12 which are particularly significant to the present invention are provided herein. A representative tape drive 12 is sold by Quantum Corporation, the Assignee of the present invention under the trademark DLT™4000.

Figure 1A:
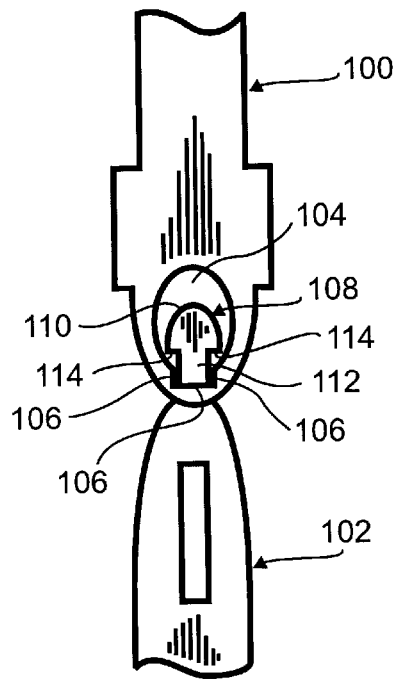
FIG. 1A is a top plan view of an uncoupled, prior art cartridge leader and take-up leader.
Figure 1B:
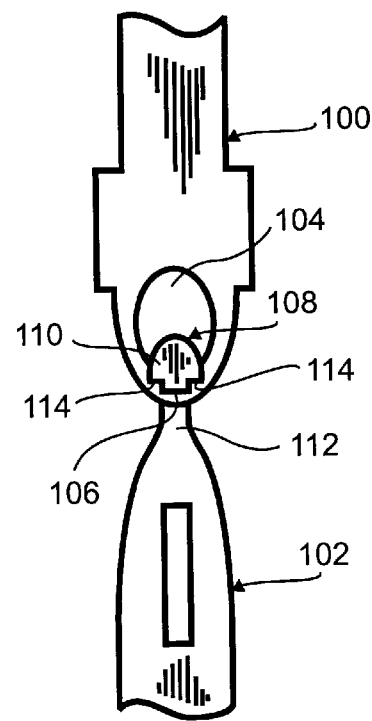
FIG. 1B is a top plan view of a coupled, prior art cartridge leader and take-up leader.
Figure 3:
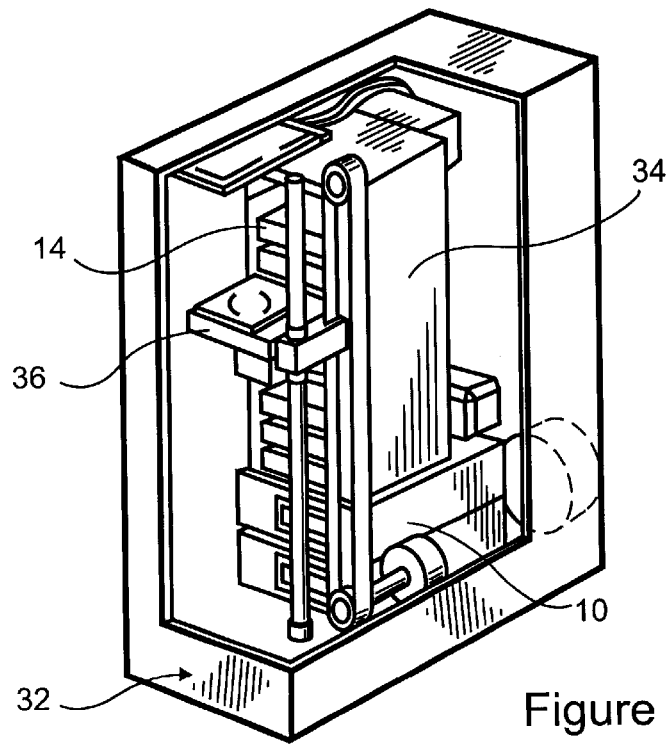
FIG. 3 is a perspective, partly cut-away view of a tape library having features of the present invention.

The tape drive 12 is typically installed within a computer (not shown), or a word processor (not shown). Alternately, the tape drive 12 can be utilized as part of a tape library 32. In the embodiment illustrated in FIG. 3, the tape library 32 includes a plurality of cartridges 14 which are retained in a multiple cartridge magazine 34, a robotic cartridge handler 36 and a pair of the tape drives 12. The robotic cartridge handler 36 is used to selectively retrieve one of the cartridges 14 from the cartridge magazine 34 and place the cartridge 14 within one of the tape drives 12. A representative tape library 32 is sold under the trademark DLTstor™, by Quantum Corporation.

Referring back to FIG. 2, the drive housing 15 retains the various components of the tape drive 12. The data transducer 16 transfers information to and from the storage tape 26. A plurality of tape rollers 38 can be used for guiding the storage tape 26 from the cartridge reel 24 past the data transducer 16 and onto the take-up reel 17. The receiver 20 is adapted to selectively receive the cartridge 14. The receiver 20 includes a protruding wall 40 which contacts a cartridge door (not shown) of the cartridge 14 during movement of the cartridge 14 in the receiver 20. This causes the cartridge door to move from a closed door position to an open door position.

The buckling device 22 rotates relative to the receiver 20 to couple and uncouple the buckle 30. The buckling device 22 includes a buckler hook 44 which projects away from a front surface 46 of the buckling device 22. The buckler hook 44 is selectively positioned within a buckler aperture 48 (FIGS. 5A–8A) in the take-up leader 18 to selectively retain the take-up leader 18.

The storage tape 26 stores data in a form that can be subsequently retrieved if necessary. A magnetic storage tape 26 is commonly used to store data in digital form. For conservation of space, the storage tape 26 has a tape width of preferably at least approximately one-half an inch (0.5 in) in width. Alternately, for example, the storage tape 26 can have a tape width of between approximately four millimeters to eight millimeters (4.0 mm–8.0 mm). The storage tape 26 includes a storage surface on one side of the storage tape 26 for storing data. The storage surface is divided into a plurality of tracks (not shown). Each track can be a linear pattern which extends the length of the storage tape 26. Alternately, for example, the data can be recorded in diagonal strips across the storage tape 26. The storage tape 26 is initially retained on the cartridge reel 24 of the cartridge 12.

Figure 4:
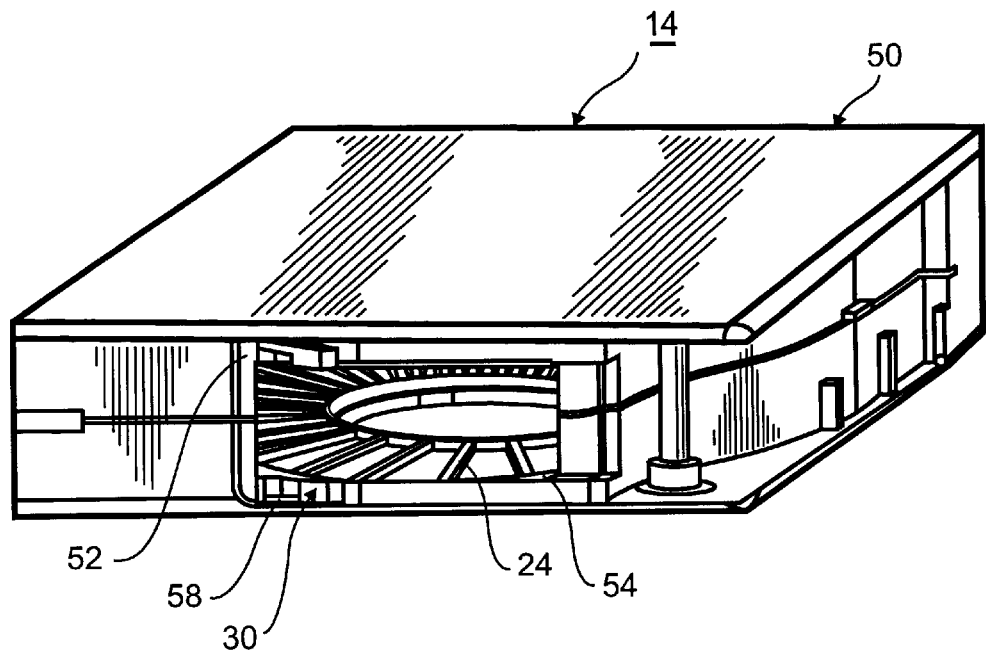
FIG. 4 is a perspective view of a cartridge having features of the present invention.

As can best be seen with reference to FIG. 4, the cartridge 24 includes a substantially rectangular cartridge housing 50 which encloses the cartridge reel 24 and the storage tape 26. The cartridge housing 50 includes the cartridge door (not shown for clarity) which pivots between an open door position in which the cartridge leader 28 is exposed and a closed door position. FIG. 4 also illustrates that the cartridge housing 50 includes a cartridge stop 52 positioned near the cartridge reel 24 and a housing opening 54 in the cartridge housing 50. The cartridge stop 52 is sized and positioned to prevent the portion of buckle 30 which is attached to the cartridge leader 28 from retracting onto the cartridge reel 24. This maintains the buckle 30 outside the storage tape 26 path on the cartridge reel 24. Further, this ensures that the buckling occurs away from the storage tape 26 to prevent damage to the storage tape 26.

The buckle 30 secures the take-up leader 18 of the tape drive 12 to the cartridge leader 28 of the cartridge 14. The buckle 30 includes a first buckle component 56 attached to one of the leaders 18, 28 and a second buckle component 58 attached to the other one of the leaders 18, 28. A number of alternate embodiments of the buckle 30 are illustrated in the FIGS. 5A–8B. Generally, in each embodiment illustrated, the first buckle component 56 includes a buckle bar 60 which is secured to one of the leaders 18, 28. In the embodiments illustrated herein, the buckle bar 60 is a substantially straight piece of a rigid material, having a substantially circular cross section.

The buckle bar 60 preferably has a bar length 62 which is greater than a leader width 61 of the leaders 18, 28. The buckle bar 60 extends transversely across one of the leaders 18, 28. Because the bar length 62 is greater than the leader width 61, the buckle bar 60 has a pair of bar ends 63 which cantilever past opposed leader edges 64 of the leaders 18, 28. Stated another way, the buckle bar 60 includes a first bar section 65 which extends away from one of the leader edges 64 and a second bar section 66 which extends away from the other leader edge 64.

Additionally, in each embodiment illustrated, the second buckle component 58 including a pair of spaced apart receivers 68. Each receiver 68 is sized and shaped to receive a portion of one of the bar sections 65 to couple the take-up leader 18 to the cartridge leader 28. Further, the use of two spaced apart receivers 68 ensures a reliable connection between the leaders 18, 28.

The first buckle component 56 and the second buckle component 58 can be made of a number of durable and strong materials such as a metal covered with plastic or a hard plastic. This enhances the durability of the buckle 30 and reduces the likelihood of failure from excessive pressure of fatigue.

FIGS. 5A–5G illustrate a first embodiment of the buckle 30. In this embodiment, the first buckle component 56 is attached to the take-up leader 18 while the second buckle component 58 is attached to the cartridge leader 28. As can best be seen with reference to FIG. 5A, each of the bar ends 63 of the buckle bar 60 is spherical shaped. Further, in this embodiment, the receivers 68 are secured together with a connector bar 70, which is attached to the cartridge leader 28. In this embodiment, the receivers 68 are spaced apart a receiver distance 71 by the connector bar 70.

Preferably, the receiver distance 71 is longer than the leader width 61. This allows the receivers 68, 70 to engage the cartridge stop 52 (FIG. 4) in the cartridge housing 50 to inhibit the cartridge leader 28 from being pulled back into the cartridge housing 50. Further, this keeps the buckle 30 away from the cartridge reel 24 and out of the path of the storage tape 26 to protect the storage tape 26.

In the embodiment illustrated in FIGS. 5A–5C and 5E–5G, each receiver 68 is sized and shaped to receive one of the bar ends 63. Each receiver 68 is defined by a substantially rectangular receiver housing 72. Each receiver housing 72 includes a channel 74 having a channel opening 75 and a channel end 76. During coupling, the buckle bar 60 is inserted into the channel opening 75. Subsequently, the buckle bar 60 is forced to slide in the channel 74 until the buckle bar 60 reaches the channel end 76. Preferably, each channel 74 includes a bump 78 which projects into the channel 74 near the channel end 76. The bump 78 reliably holds the buckle bar 60 against the channel end 76. In the embodiment illustrated in the FIGS. 5A–5C and 5E–5G, each bump 78 is ramped shaped to facilitate movement over the bump 78. Alternately, for example, each bump 78 could be semi-circular shaped.

Each channel 74 is wide enough to receive the buckle bar 60. Further, the channels 74 are spaced apart so that a bottom of each channel 74 substantially contacts the bar ends 63 of the buckle bar 60 when the buckle bar 60 is placed in the channels 74.

Figure 5A:
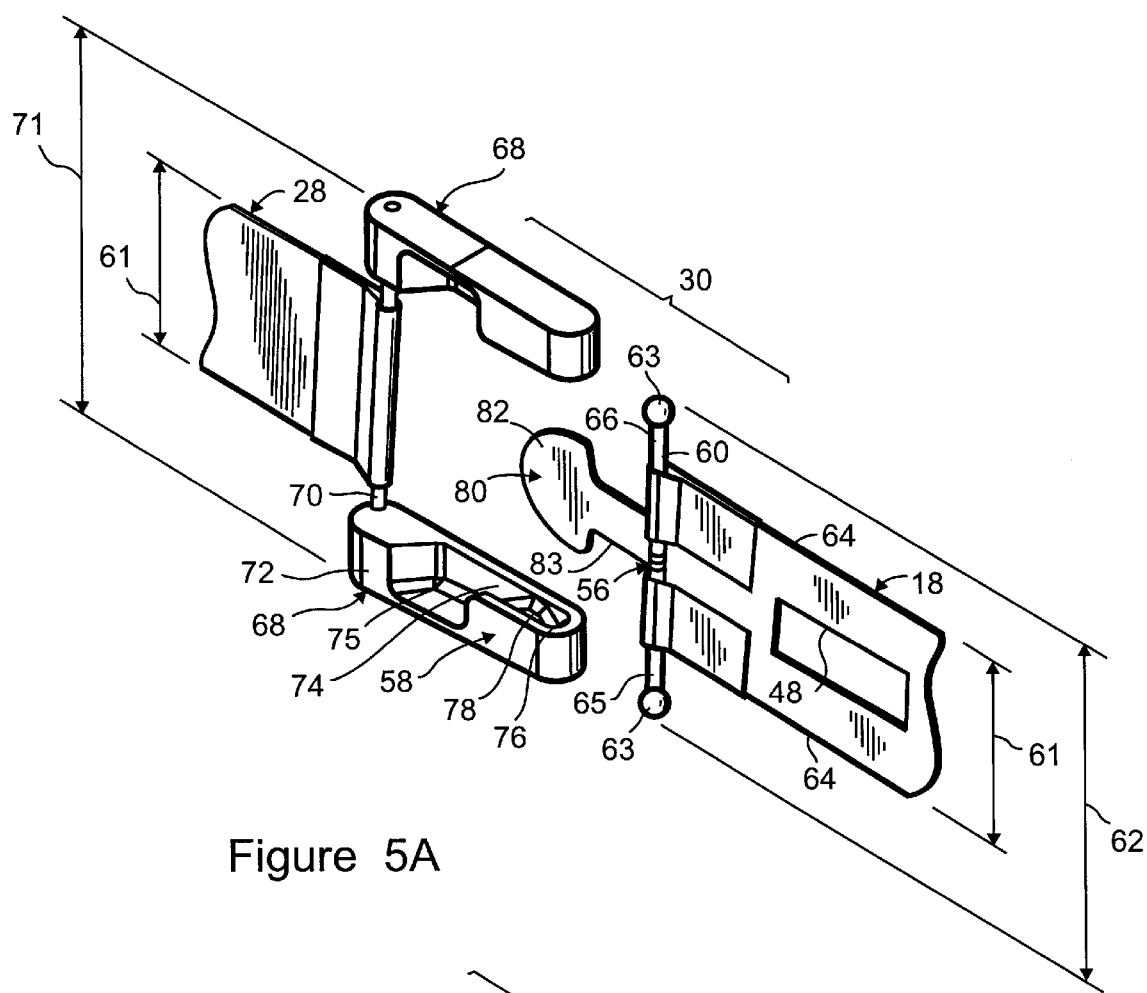
FIG. 5A is a perspective view of a first embodiment of an uncoupled buckle having features of the present invention.
Figure 5B:
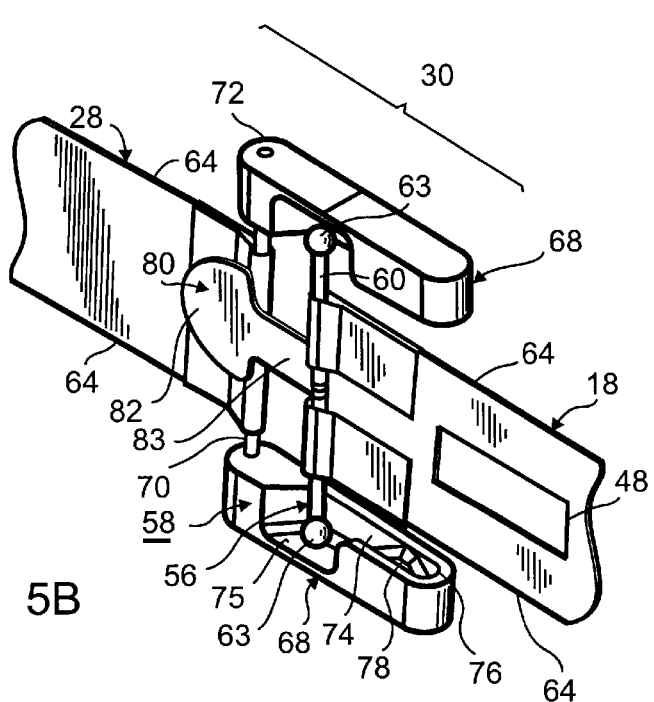
FIG. 5B is a perspective view of the buckle in FIG. 5A during the coupling process.
Figure 5C:
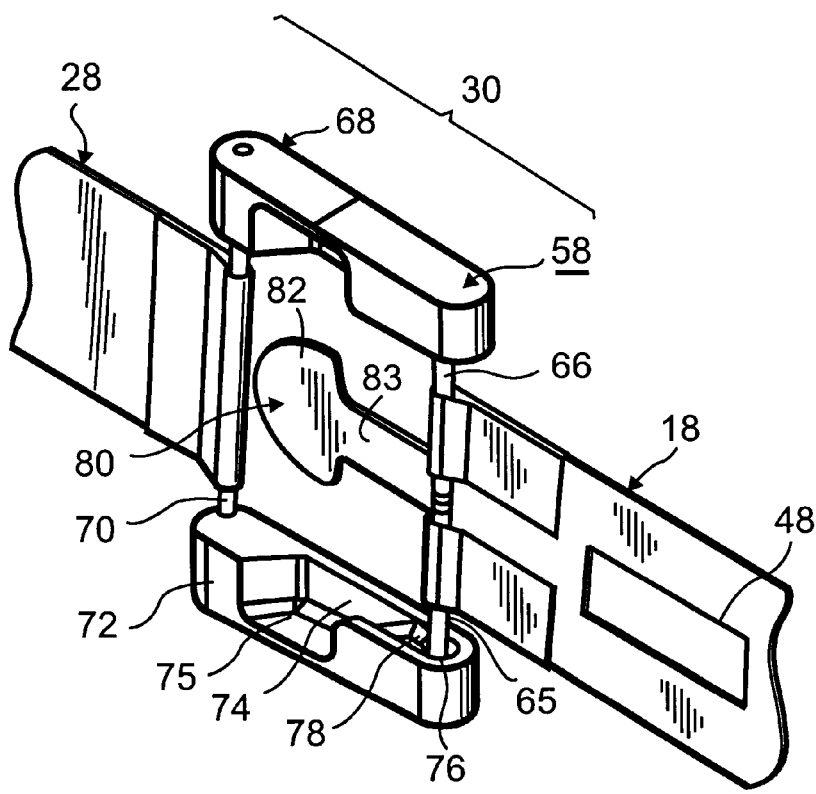
FIG. 5C is a perspective view of the buckle of FIG. 5A in a coupled position.
Figure 5D:
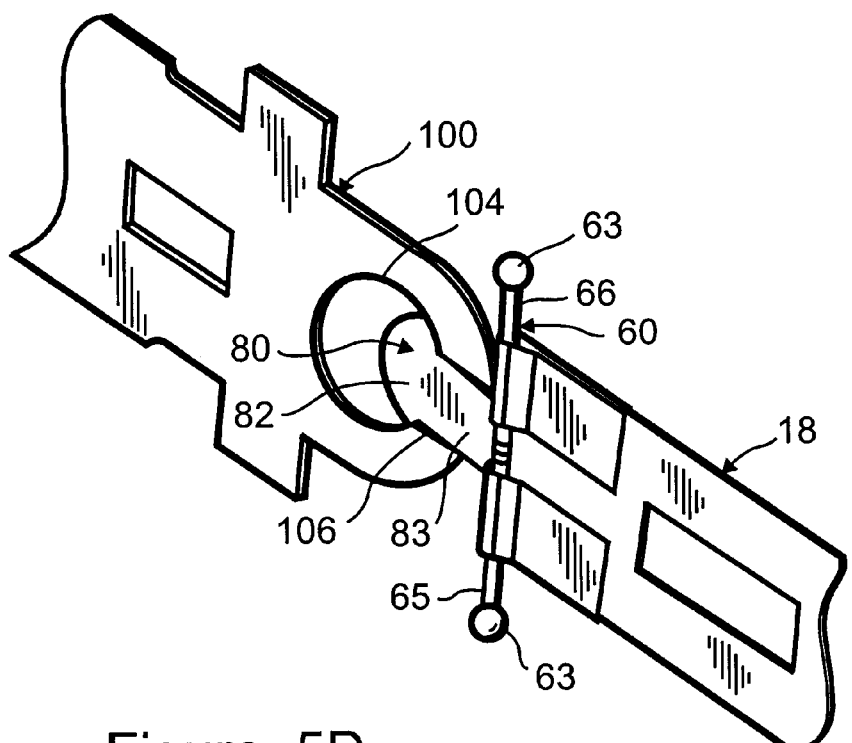
FIG. 5D is a perspective view of a portion of the buckle of FIG. 5A coupled to a prior art cartridge leader.
Figure 5E:
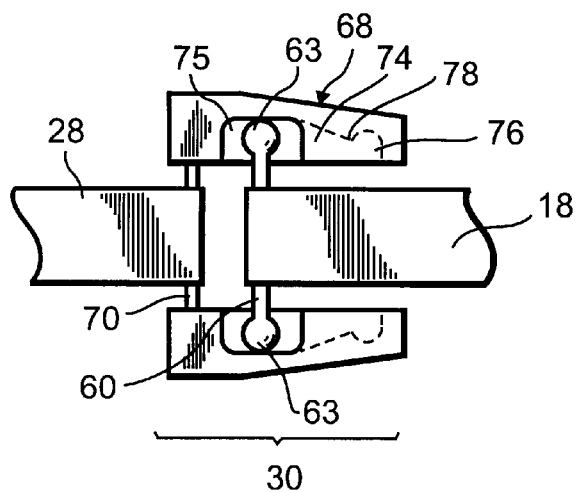
FIG. 5E is an illustration of the buckle of FIG. 5A in an uncoupled position.
Figure 5F:
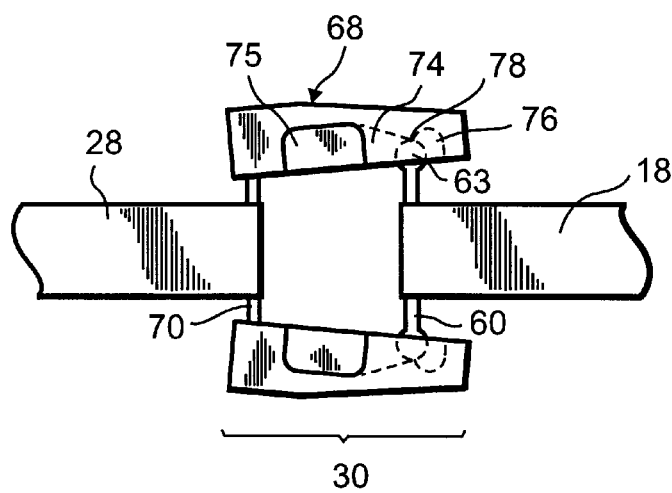
FIG. 5F is an illustration of the buckle of FIG. 5A during coupling.
Figure 5G:
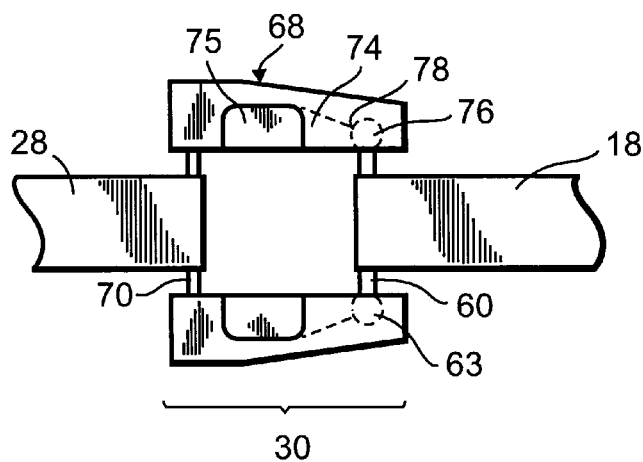
FIG. 5G is an illustration of the buckle of FIG. 5A in a coupled position.

FIGS. 5E–5G illustrate the interaction between the first and second buckle components 56, 58 during the buckling process. In particular, referring to FIG. 5F, the receivers 20 and the connector bar 70 can flex to allow the buckle bar 60 to pass over the bumps 78.

Preferably, the take-up leader 18 is also compatible with one or more prior art cartridges. Stated another way, the take-up leader 18 is preferably designed to be compatible with two or more different styles of cartridges. For example, the take-up leader 18 can include an additional buckle component 80 which allows the take-up leader 18 to couple to a prior art cartridge. In the embodiment illustrated in FIG. 5O, the additional buckle component 80 is a leader tab which projects away from a distal end of the take-up leader 18. In this embodiment, the buckle component 80 is mushroom shaped and adapted to engage a hoop 104 and a notch 106 of a prior art cartridge leader 100. The buckle component 80 includes a nose 82 which is dimensioned to fit through the hoop 104 but not the notch 106. The buckle component 80 also includes a neck 83 which is designed to fit in both the hoop 104 and notch 106. Thus, the additional buckle component 80 allows the tape drive 12 and the take-up leader 18 to also be compatible with old style cartridges.

Figure 6:
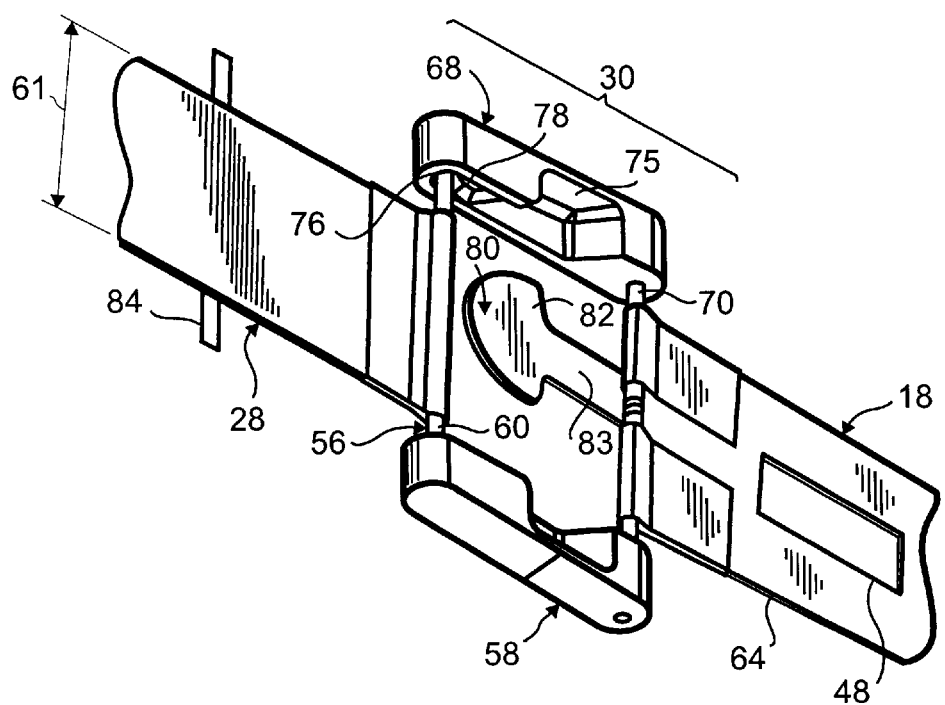
FIG. 6 is a perspective view of another embodiment of a buckle having features of the present invention.

FIG. 6 illustrates another embodiment of the buckle 30. The first buckle component 56 and the second buckle component 58 of the buckle 30 are substantially the same as that illustrated in FIGS. 5A–5C. However, in FIG. 6, the second buckle component 58 is attached to the take-up leader 18 while the first buckle component 56 is secured to the cartridge leader 28. Also different from FIGS. 5A–5C, the cartridge leader 28 can include a leader stop 84 which extends laterally from the leader edges 64 of the cartridge leader 28, proximal to a distal end of the cartridge leader 28. The leader stop 84 is sized and shaped to engage the cartridge stop 52 in the cartridge housing 50 to inhibit the cartridge leader 28 from being pulled back into the cartridge housing 50.

Figure 7A:
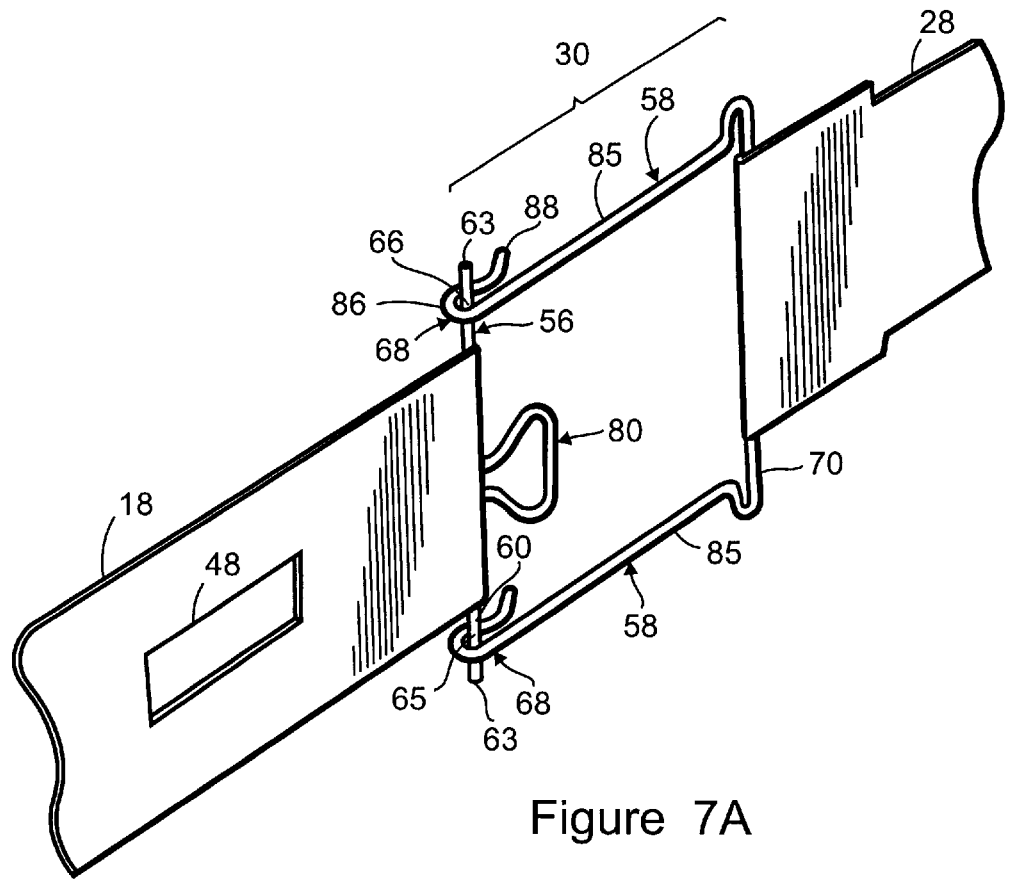
FIG. 7A is a perspective view of another embodiment of a buckle having features of the present invention.

FIG. 7A illustrates another embodiment of the buckle 30. In this embodiment, the first buckle component 56 is attached to the take-up leader 18 while the second buckle component 58 is attached to the cartridge leader 28. Similar to the embodiments provided above, the buckle bar 60 is elongated, bar shaped and includes a pair of opposed bar ends 63. In this embodiment, the spaced apart receivers 68 are again secured together with a connector bar 70 which is secured to the cartridge leader 28. Again, the receivers 68 are spaced apart sufficiently to engage the cartridge stop 54 in the cartridge housing 50 to inhibit the cartridge leader 28 from being pulled back into the cartridge housing 50.

In the embodiment illustrated in FIG. 7A, the connector bar 70 and the receivers 68 are made as a uniform second buckle component 58. The second buckle component 58 includes the relatively straight connector bar 70 with a pair of receiver bars 85 extending generally transversely to the connector bar 70. Each receiver 68 is positioned at a distal end of each connector bar 70. In this embodiment, each receiver 68 is a clasp 86 which is sized and shaped to receive a portion of the buckle bar 60. Each clasp 86 is hook shaped and substantially encircles a portion of one of the bar sections 65, 66. A distal end of each clasp 86 includes an outwardly protruding lip 88 which curves away from the receiver bar 85 to facilitate placement of the bar section 65, 66 within the clasp 86. In this embodiment, the receivers 68 are made of a spring like material having a circular cross section.

Figure 7B:
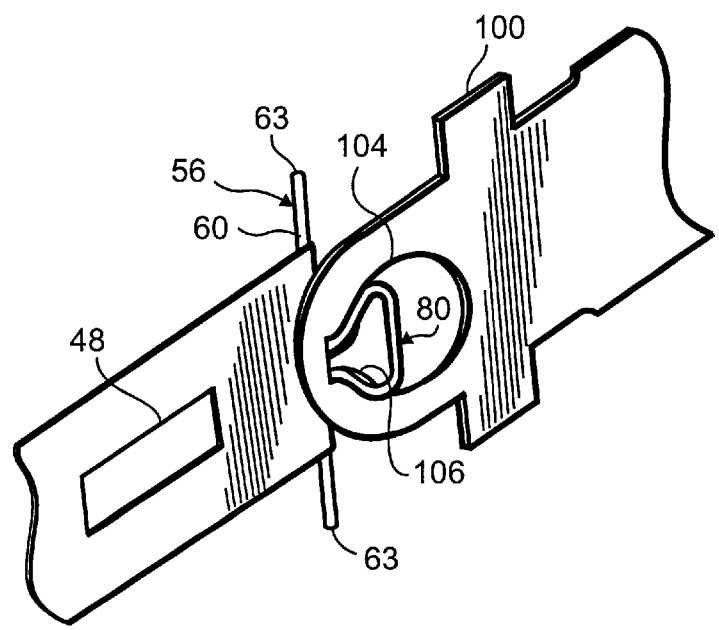
FIG. 7B is a perspective view of a portion of a buckle coupled to a prior art cartridge leader.

As illustrated in FIG. 7B, the take-up leader 18 preferably also includes the additional buckle component 80 shaped similar to a tab which projects away from the distal end of the take-up leader 18. The tab is adapted to engage a prior art cartridge leader 100. The additional buckle component 80 allows the tape drive 12 and the take-up leader 18 to also be compatible with prior art cartridges. In this embodiment, the additional buckle component 80 is formed from the same wire as the buckle bar 60.

Figure 8A:
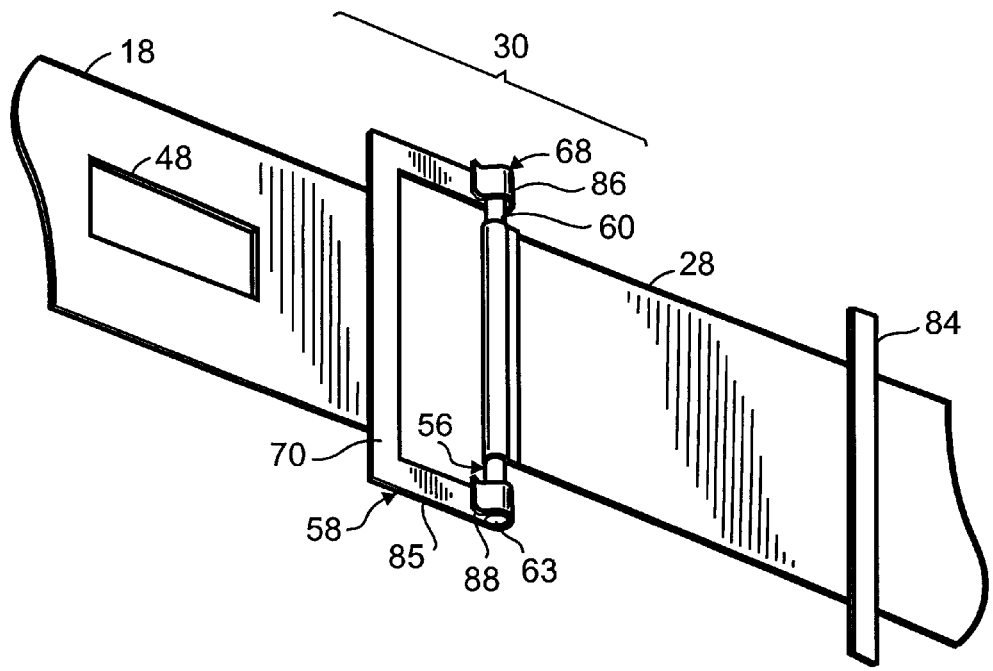
FIG. 8A is a perspective view of another embodiment of a buckle having features of the present invention.

FIG. 8A illustrates yet another embodiment of the buckle 30. The first buckle component 56 and the second buckle component 58 of the buckle 30 are substantially the same as that illustrated in FIG. 7A. However, in FIG. 8A, the second buckle component 58 is attached to the take-up leader 18 while the first buckle component 56 is attached to the cartridge leader 28. The embodiment illustrated in FIG. 8A also differs from that in FIG. 7A in that the second buckle component 58 has a rectangular cross-section instead of a circular cross-section as illustrated in FIG. 7A.

Figure 8B:
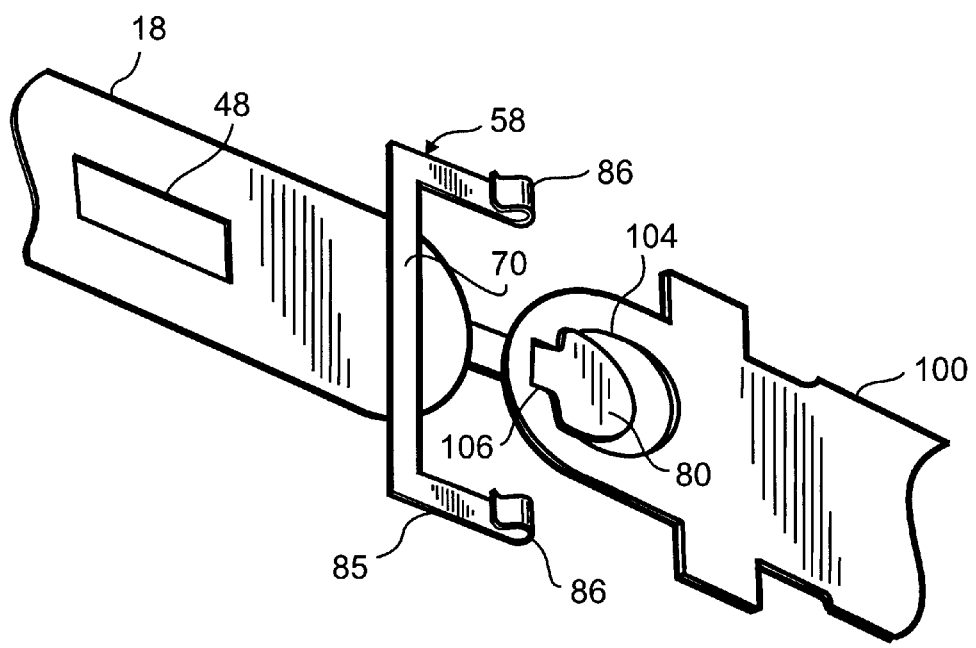
FIG. 8B is a perspective view of a portion of a buckle coupled to a prior art cartridge leader.

As illustrated in FIG. 8B, the take-up leader 18 can also include the additional buckle component 80 which projects away from the distal end of the take-up leader 18. The additional buckle component 80 is adapted to engage to a prior cartridge leader 100.

Operation of one embodiment of the buckle 30 can probably best be understood with reference to FIGS. 2 and 5A–5C. Initially, the cartridge 14 is inserted into the receiver 20. Insertion of the cartridge 14 causes the cartridge door to rotate to the open position. Once the cartridge 14 is inserted, the buckle bar 60 is positioned within the channel openings 75 of the channels 74 (see FIG. 5B). Next, buckling device 22 causes the buckle bar 60 to slide in the channels 74 over the bumps 78 and against the channel end 76 (see FIG. 5C). In this position, the buckle 30 is securely coupled. Additional movement of the buckling device 22 allows the buckler hook 44 to move out of the buckler aperture 48.

Subsequently, during the eject cycle, the buckling device 22 causes the buckler hook 44 to engage the buckler aperture 48 in the take-up leader 18. Next, the buckling device 22 moves and forces the buckler bar 60 over bumps 78 to the channel opening 75. Finally, the cartridge 14 can be removed from the receiver 20.

Importantly, with the present invention, the unique buckle 30 securely retains the take-up leader 18 to the cartridge leader 28. Further, the buckle 30 is made of strong, rigid materials which are durable.

While the particular tape drive 12, cartridge 14 and buckle 30 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A combination comprising:

a tape drive including a take-up leader;

a cartridge including a cartridge leader; and a buckle which secures the take-up leader of the tape drive to the cartridge leader of the cartridge, the buckle including (i) a first buckle component secured to one of the leaders, the first buckle component including a first bar end which cantilevers transversely from the leader; and (ii) a second buckle component secured to the other one of the leaders, the second buckle component including a first receiver which is sized and shaped to receive a portion of the first bar end to couple the take-up leader to the cartridge leader.

2. The combination of claim 1 wherein the first buckle component includes a bar shaped, second bar end spaced apart from the first bar end and the second buckle component includes a second receiver which is sized and shaped to receive a portion of the second bar end to couple the take-up leader to the cartridge leader.

3. The combination of claim 2 wherein each receiver includes a channel which is sized and shaped to receive a portion of one of the bar ends to couple the take-up leader to the cartridge leader; wherein each channel includes a bottom which faces the other channel.

4. The combination of claim 2 wherein each receiver includes a channel which is sized and shaped to receive a portion of one of the bar ends and wherein each channel includes a bump which inhibits movement of the bar end in each channel.

5. A tape library including the combination of claim 1 and a cartridge handler which is adapted to move the cartridge relative to the tape drive.

6. A combination comprising:

a tape drive including a take-up leader;

a cartridge including a cartridge leader; and a buckle which secures the take-up leader of the tape drive to the cartridge leader of the cartridge, the buckle including (i) a first buckle component secured to one of the leaders, the first buckle component including a pair of spaced apart bar sections; and (ii) a second buckle component secured to the other one of the leaders, the second buckle component including a pair of spaced apart receivers, each receiver being sized and shaped to receive a portion of one of the bar sections to couple the take-up leader to the cartridge leader, each receiver including a bottom; and wherein the bottom of the first receiver faces the bottom of the second receiver.

7. The combination of claim 6 wherein the first buckle component includes a bar shaped buckle bar which is attached to the one of the leaders, the buckle bar having a pair of bar ends which cantilever transversely from opposed edges of the leader to define the bar sections.

8. The combination of claim 6 wherein each receiver includes a channel which is sized and shaped to receive a portion of one of the bar sections to couple the take-up leader to the cartridge leader.

9. The combination of claim 8 wherein each channel includes a bump which inhibits movement of the bar section in each channel.

10. A tape library including the combination of claim 6 and a cartridge handler which is adapted to move the cartridge relative to the tape drive.

11. A cartridge adapted for use with a tape drive, the tape drive having a take-up leader including a bar shaped buckle bar, the buckle bar having a pair of bar ends which cantilever transversely from opposed edges of the take-up leader, the cartridge comprising:

a cartridge housing;

a storage tape including a cartridge leader; and a first receiver and a second receiver secured to the cartridge leader, each receiver being adapted to receive a portion of one of the bar ends to couple the take-up leader to the cartridge leader.

12. The cartridge of claim 11 wherein each receiver includes a channel which is sized and shaped to receive a portion of one of the bar ends to couple the take-up leader to the cartridge leader, each channel including a bottom which faces the bottom of the other channel.

13. The cartridge of claim 12 wherein each channel includes a bump which inhibits movement of the buckle bar in the channel.

14. The cartridge of claim 11 further comprising a cartridge reel which receives the storage tape and a cartridge stop attached to the cartridge housing and positioned near the cartridge reel; wherein the receivers are designed to engage the cartridge stop to inhibit movement of the receivers onto the cartridge reel.

15. The cartridge of claim 11 wherein each receiver includes a clasp which is sized and shaped to substantially encircle a portion of one of the bar sections.

16. A cartridge adapted for use with a tape drive, the tape drive having a take-up leader including a pair of spaced apart receivers, the cartridge comprising:

a cartridge housing;

a storage tape including a cartridge leader; and a bar shaped, buckle bar secured to the cartridge leader, the buckle bar including a pair of bar ends which cantilever transversely from opposed leader edges of the cartridge leader, each bar end being adapted to engage one of the receivers to couple the cartridge leader to the take-up leader.

17. The cartridge of claim 16 wherein the buckle bar is substantially straight and is adapted to simultaneously fit within a portion of both of the receivers to couple the cartridge leader to the take-up leader.

18. A tape drive adapted for use with a cartridge, the cartridge having a cartridge leader including a bar shaped buckle bar, the buckle bar having a pair of bar ends which cantilever transversely from opposed edges of the take-up leader, the tape drive comprising:

a drive housing;

a take-up reel including a take-up leader; and a first receiver and a spaced apart second receiver secured to the take-up leader, each receiver being adapted to receive a portion of one of the bar ends to couple the take-up leader to the cartridge leader.

19. The tape drive of claim 18 wherein each receiver includes a channel which is sized and shaped to receive a portion of one of the bar ends to couple the take-up leader to the cartridge leader, each channel including a bottom which faces the other channel.

20. The tape drive of claim 19 wherein each channel includes a bump which inhibits movement of the buckle bar in the channel.

21. The tape drive of claim 18 further comprising a mushroom shaped leader tab secured to the take-up leader.

22. The cartridge of claim 18 wherein each receiver includes a clasp which is sized and shaped to substantially encircle a portion of one of the bar sections.

23. A tape drive adapted for use with a cartridge, the tape drive having a cartridge leader including a pair of spaced apart receivers, the tape drive comprising:

a drive housing;

a take-up reel including a take-up leader; and a bar shaped, buckle bar secured to the take-up leader, the buckle bar including a pair of bar ends which cantilever transversely from opposed leader edges of the cartridge leader, each bar end being adapted to engage one of the receivers to couple the cartridge leader to the take-up leader.

24. The tape drive of claim 23 wherein the buckle bar is substantially straight is adapted to simultaneously fit within a portion of both of the receivers to couple the cartridge leader to the take-up leader.

25. The tape drive of claim 23 further comprising a mushroom shaped leader tab secured to the take-up leader.

26. A tape drive adapted for alternate use with a first cartridge and a second cartridge, the first cartridge having a first cartridge leader and the second cartridge having a second cartridge leader, the tape drive comprising:

a drive housing;

a take-up reel; and a take-up leader secured to the take-up reel, the take-up leader including two alternate buckle components, one of the buckle components being adapted to secure the take-up leader to the first cartridge leader while the other buckle component is adapted to secure the take-up leader to the second cartridge leader.

27. The tape drive of claim 26 wherein one of the buckle components includes a first receiver and a second receiver which are adapted to receive a portion of a bar shaped buckle bar which is attached to and cantilevers transversely from opposed edges of the first cartridge leader to couple the take-up leader to the first cartridge leader.

28. The tape drive of claim 27 further comprising a second receiver spaced apart from the first receiver, the second receiver being sized and shaped to receive a portion of the buckle bar to couple the take-up leader to the first cartridge leader.

29. The tape drive of claim 27 wherein the other one of the buckle components includes a tab which is adapted to fit within a hoop in the second cartridge leader to couple the take-up leader to the second cartridge leader.

30. The tape drive of claim 26 wherein one of the buckle components includes a bar shaped, buckle bar secured to the take-up leader, the buckle bar including a pair of bar ends which cantilever transversely from opposed leader edges the take-up leader, the buckle bar being adapted to engage the first cartridge leader to couple the take-up leader to the first cartridge leader.

31. The tape drive of claim 30 wherein the other one of the buckle components includes a tab which is adapted to fit within a hoop in the second cartridge leader to couple the take-up leader to the second cartridge leader.

32. A combination comprising:

a tape drive including a take-up leader;

a cartridge including a cartridge leader; and a buckle which secures the take-up leader of the tape drive to the cartridge leader of the cartridge, the buckle including (i) a first buckle component secured to one of the leaders, the first buckle component including a buckle bar, the buckle bar having a pair of bar ends which cantilever transversely from opposed edges of the leader; and (ii) a second buckle component secured to the other one of the leaders, the second buckle component including a first receiver and a second receiver, each receiver being is sized and shaped to receive a portion of one of the bar ends to couple the take-up leader to the cartridge leader.

33. A combination comprising:

a tape drive including a take-up leader;

a cartridge including a cartridge leader; and a buckle which secures the take-up leader of the tape drive to the cartridge leader of the cartridge, the buckle including (i) a first buckle component secured to one of the leaders, the first buckle component including a bar shaped first bar section and a bar shaped, second bar section spaced apart from the first bar section (ii) a second buckle component secured to the other one of the leaders, the second buckle component including a first receiver and a second receiver, each receiver being sized and shaped to receive a portion of one of the bar sections to couple the take-up leader to the cartridge leader; wherein each receiver includes a clasp which is sized and shaped to substantially encircle a portion of one of the bar sections.

34. A combination comprising:

a tape drive including a take-up leader;

a cartridge including a cartridge leader; and a buckle which secures the take-up leader of the tape drive to the cartridge leader of the cartridge, the buckle including (i) a first buckle component secured to one of the leaders, the first buckle component including a pair of spaced apart bar sections; and (ii) a second buckle component secured to the other one of the leaders, the second buckle component including a pair of spaced apart channels, each channel being sized and shaped to receive a portion of one of the bar sections to couple the take-up leader to the cartridge leader, wherein at least one of the channels includes a bump which inhibits movement of the bar section in the channel.

\* \* \* \* \*